(12) United States Patent
Leggett (10) Patent No.: US 8,936,691 B2
(45) Date of Patent: Jan. 20, 2015

(54) MAGNETIC PROPERTY RETENTION

(71) Applicant: Apple Inc., Cupertino, CA (US)

(72) Inventor: William F. Leggett, San Francisco, CA (US)

(*) Notice: Subject to any disclaimer, the term of this patent is extended or adjusted under 35 U.S.C. 154(b) by 0 days.

(21) Appl. No.: 13/855,675

(22) Filed: Apr. 2, 2013

(65) Prior Publication Data

US 2014/0110045 A1    Apr. 24, 2014

Related U.S. Application Data

(60) Provisional application No. 61/715,817, filed on Oct. 18, 2012.

(51) Int. Cl.
| | | |
|---|---|---|
| *B29C 65/02* | (2006.01) | |
| *B29C 65/48* | (2006.01) | |
| *B29C 65/52* | (2006.01) | |
| *B32B 37/06* | (2006.01) | |
| *B32B 37/12* | (2006.01) | |
| *B32B 38/18* | (2006.01) | |
| *B32B 43/00* | (2006.01) | |
| *C09J 5/06* | (2006.01) | |
| *H01F 41/02* | (2006.01) | |

(52) U.S. Cl.
CPC .......... *H01F 41/0266* (2013.01); *H01F 41/02* (2013.01)
USPC .............. 156/247; 156/307.1; 156/307.3; 156/307.7

(58) Field of Classification Search
USPC .......... 156/247, 306.6, 306.9, 307.1, 307.3, 156/307.7
See application file for complete search history.

(56) References Cited

U.S. PATENT DOCUMENTS

| | | | | |
|---|---|---|---|---|
| 4,141,137 | A * | 2/1979 | De Wolf et al. | 29/596 |
| 4,195,542 | A * | 4/1980 | Zimmer | 83/664 |
| 6,592,085 | B2 * | 7/2003 | Iwata et al. | 248/118.1 |
| 6,729,887 | B2 * | 5/2004 | Katsumata et al. | 439/39 |
| 7,287,738 | B2 * | 10/2007 | Pitlor | 248/544 |
| 7,561,015 | B2 * | 7/2009 | Vesci et al. | 335/302 |
| 8,390,412 | B2 | 3/2013 | Lauder et al. | |
| 8,390,413 | B2 | 3/2013 | Lauder et al. | |
| 8,702,633 | B2 * | 4/2014 | Voss et al. | 601/41 |
| 2009/0027583 | A1 | 1/2009 | McBroom et al. | |
| 2009/0097691 | A1 | 4/2009 | Eaton | |
| 2013/0027867 | A1 | 1/2013 | Lauder et al. | |

FOREIGN PATENT DOCUMENTS

| | | | | |
|---|---|---|---|---|
| EP | 2433347 | | 3/2012 | |
| JP | 08223838 | A * | 8/1996 | H02K 1/27 |

OTHER PUBLICATIONS

English Abstract of JP 08-223838 (Jun. 4, 2014).*
Machine English translation of JP 08-223838 (Jun. 4, 2014).*

* cited by examiner

*Primary Examiner* — Sing P Chan
(74) *Attorney, Agent, or Firm* — Womble Carlyle Sandridge & Rice LLP (57) ABSTRACT

A method and an apparatus for retaining magnetic properties of a magnet while undergoing manufacturing processes are presented. Ferrous materials with relatively good magnetic permeability are disposed adjacent to poles of magnet substantially containing magnetic field lines from the magnet within the ferrous materials. When the magnetic field lines are thereby substantially contained, the magnet can be exposed to elevated temperatures without losing magnetization strength. Adhesives, particularly adhesives that cure when exposed to elevated temperatures can be used with magnets configured to contain magnetic field lines without having the magnets lose magnetic strength.

19 Claims, 7 Drawing Sheets

MAGNETIC PROPERTY RETENTION

CROSS REFERENCE TO RELATED APPLICATIONS

This U.S. patent application claims priority under 35 USC 119(e) to U.S. Provisional Patent Application No. 61/715,817 filed Oct. 18, 2012 entitled "Magnetic Property Retention" by McBroom et al. which is incorporated by reference in its entirety for all purposes.

TECHNICAL FIELD

The present invention relates generally to magnetic properties of magnets and more particularly to retaining magnetic properties of magnets during processing at elevated temperatures.

BACKGROUND

A portable computing device can include an enclosure configured to contain the various components that make up the device. For example, the enclosure can include a base portion and a lid portion. In some embodiments, one or more magnets can be used to form a magnetic latch to hold the lid portion in a closed position next to the base portion. Affixing the magnets to the lid portion can require an adhesive that can require exposure to elevated temperatures to cure within a predetermined time period. Unfortunately, elevated temperatures can cause magnets to become partially or totally demagnetized.

Therefore, what is needed is a way to configure magnets to be able to withstand elevated temperatures without losing some or all of their magnetic properties.

SUMMARY

The present application describes various embodiments regarding systems and methods for curing a temperature sensitive adhesive used in a magnet application while preserving magnetic properties. In one embodiment, a method for attaching a magnet to a lid of a personal computing device can include the steps of receiving a magnet and a magnetic shunt, attaching the magnetic shunt to the lid with an adhesive, attaching the magnet to the magnetic shunt with the adhesive, placing a magnetic keeper on the magnet where the magnet fields from the magnet are substantially contained within the magnetic shunt and the magnetic keeper, heating the magnet, the magnetic shunt and the adhesive to a predetermined temperature for a predetermined amount of time and removing the magnetic keeper.

A method for reducing the curing time of an adhesive used for bonding a magnet with preserving magnetic properties of the magnet can include the steps of receiving the magnet, affixing the magnet to a support structure with an adhesive, attaching a magnetic keeper to each magnetic pole of the magnet, heating the magnet, adhesive, magnetic keepers and support structure to a predetermined temperature and removing at least one magnetic keeper.

A fixture for curing an adhesive used for bonding a magnet while preserving magnetic properties of the magnet can include a structure configured to receive the magnet and a magnetic shunt, a temperature sensitive adhesive configured to cure at elevated temperatures placed between the magnetic shunt and the structure and placed between the magnetic shunt and the magnet and a magnetic keeper removably attached to the magnet and configured to substantially contain magnetic field lines from the magnet.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The lid and the base portion can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The lid can include magnetic assemblies configured to hold the lid in a closed position next to the base portion. The magnets within the lid can be attached with an adhesive. In one embodiment, the adhesive can benefit from exposure to elevated temperatures to enhance the curing of the adhesive. Unfortunately, exposing magnets to elevated temperatures can cause magnets to partially or fully demagnetize.

Figure 1:
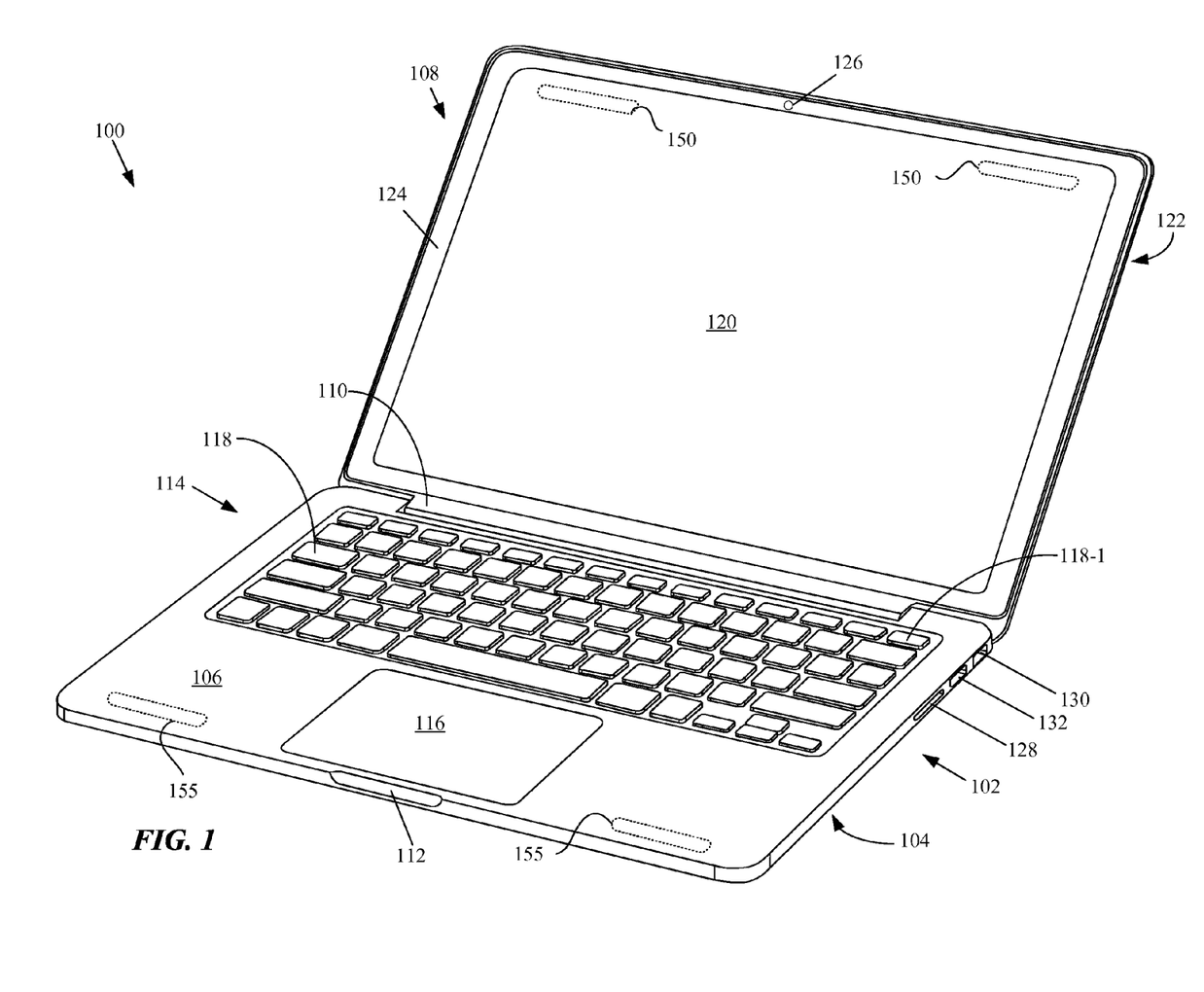
FIG. 1 shows a front facing perspective view of an embodiment of the portable computing device in the form of portable computing device in an open (lid) state.

Using a magnetic keeper can help preserve magnetic properties of magnets even while they are exposed to elevated temperatures. This and other embodiments are discussed below with reference to FIGS. 1-8. However, those skilled in the art will readily appreciate that the detailed description given herein with respect to these figures is for explanatory purposes as the invention extends beyond these limited embodiments FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each key of key pad 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120. Lid portion 108 can include magnet assemblies 150 positioned behind display 120 (shown here with dotted lines). The magnet assemblies 150 can be used to magnetically latch the lid portion 108 to the base portion 102. In one embodiment the magnet assemblies 150 can interact with and attract ferrous attractor plates 155 positioned within top case 106 (shown here with dotted lines).

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. At least one of data ports 128-132 can include, for example, an input slot that can be used to accept a memory card (such as a FLASH memory card) Also, one of data ports 128-132 can be used to accommodate data connections such as USB, FireWire, Thunderbolt, and so on.

Figure 2:
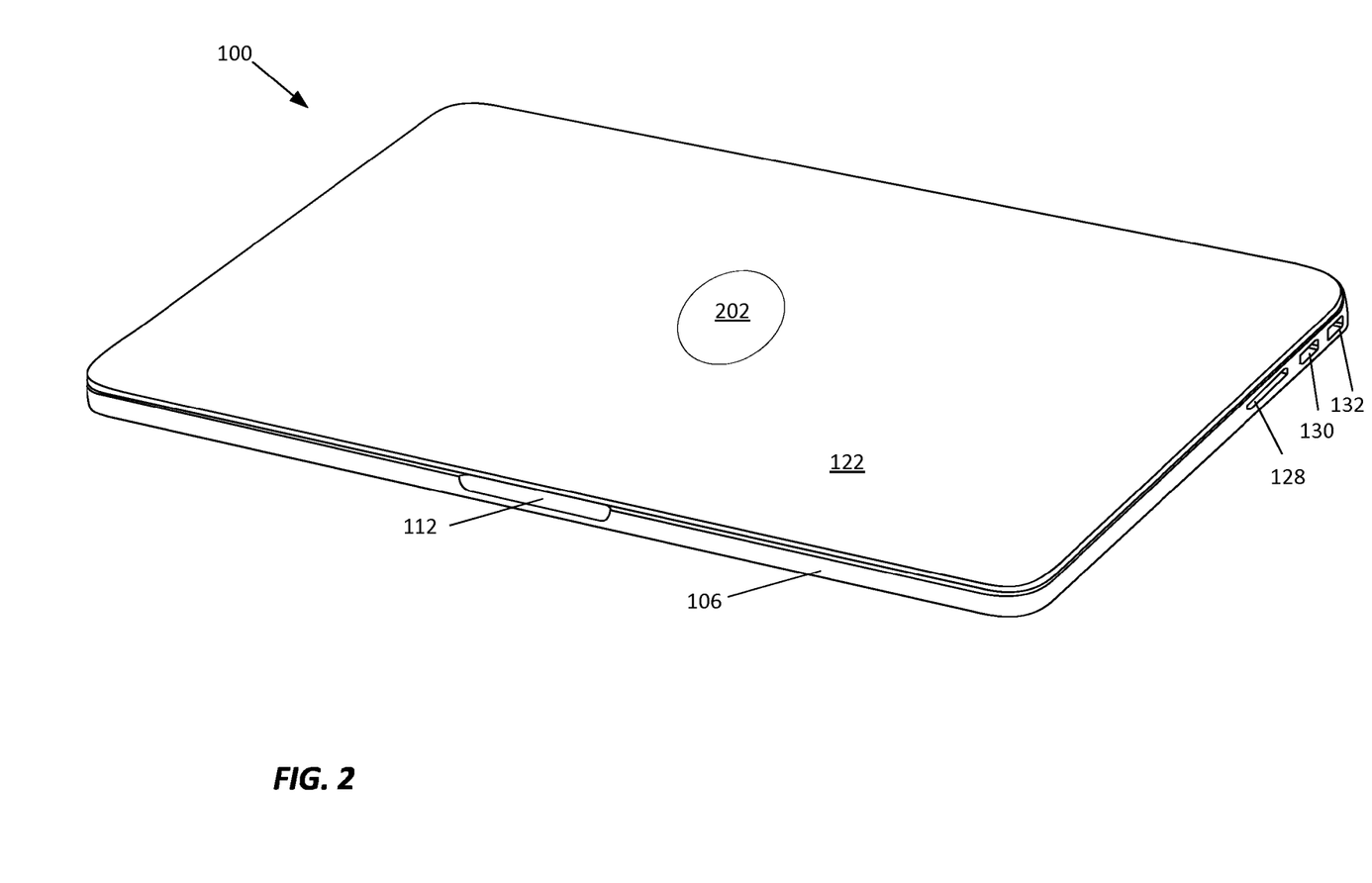
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
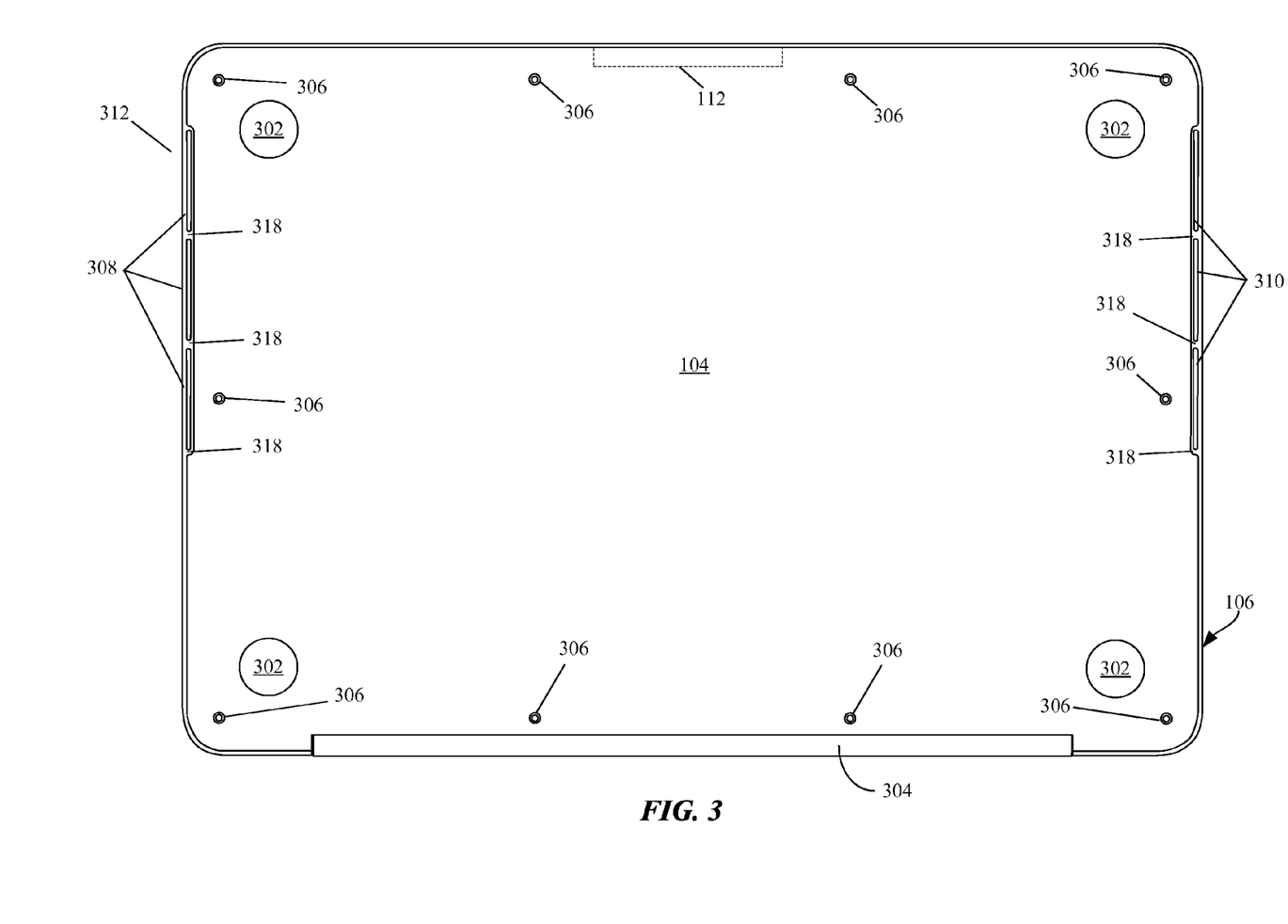
FIG. 3 shows an external view of bottom case.

FIG. 3 shows an external view of bottom case 104 showing relative positioning of support feet 302, insert 112, cosmetic wall 304 that can be used to conceal clutch assembly 110 and fasteners 306 used to secure bottom case 104 and top case 106 together. Support feet 302 can be formed of wear resistant and resilient material such as plastic. Also in view are multi-purpose front side sequentially placed vents 308 and 310 that can be used to provide a flow of outside air that can be used to cool internal components. In the described embodiment, vents 308 and 310 can be placed on an underside of top case 106 in order to hide the vents from view as well as obscure the view of an interior of portable computing device 100 from the outside. Vents 308 and 310 can act as a secondary air intake subordinate to primary air intake vents located at a rear portion of portable computing device 100 (described below). In this way, vents 308 and 310 can help to maintain an adequate supply of cool air in those situations where portions of the rear vents are blocked or otherwise have their air intake restricted.

Vents 308 and 310 can also be used to output audio signals in the form of sound generated by an audio module (not shown). Vents 308 and 310 can be part of an integrated support system in that vents 308 and 310 can be machined from the outside and cut from the inside during fabrication of top case 106. As part of the machining of vents 308 and 310, stiffener ribs can be placed within vents 308 and 310 to provide additional structural support for portable computing device 100.

Moreover, trusses 318 can be formed between vents 308 and 310 in combination with rib feature 312 to add both structural support as well as assist in defining both the cadence and size of vents 308 and 310. The cadence and size of vents 308 and 310 can be used to control air flow into portable computing device 100 as well as emission of RF energy in the form of EMI from portable computing device 100. Accordingly, stiffener ribs can separate an area within vents 308 and 310 to produce an aperture sized to prevent passage of RF energy. As well known in the art, the size of an aperture can restrict the emission of RF energy having a wavelength that can be "trapped" by the aperture. In this case, the size of vents 308 and 310 is such that a substantial portion of RF energy emitted by internal components can be trapped within portable computing device 100. Furthermore, by placing vents 308 and 310 at a downward facing surface of top case 106, the aesthetics of portable computing device 100 can be enhanced since views of internal components from an external observer are eliminated.

Figure 4:
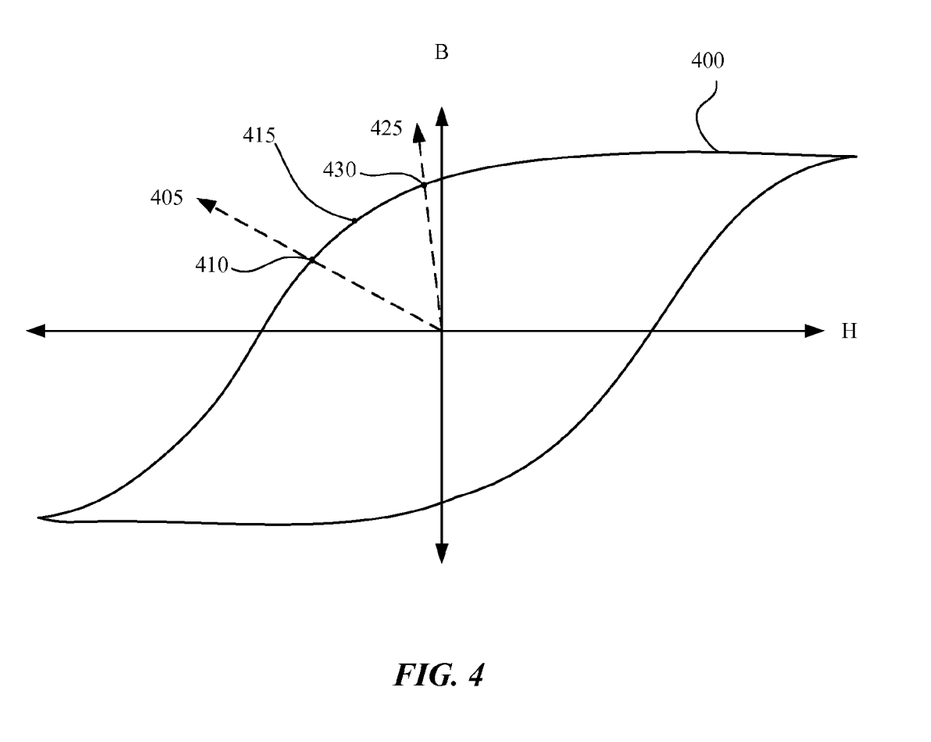
FIG. 4 is a drawing of a magnetization curve for a magnet.

Bonding magnet assemblies 150 to rear cover 122 can be difficult and can require an adhesive that can cure more quickly at elevated temperatures. Unfortunately, elevated temperatures can have an adverse effect on magnetic properties of magnets. In some cases, magnets can become partially or fully demagnetized after exposure to elevated temperatures. FIG. 4 is a drawing of a magnetization curve 400 for a magnet. The magnetization curve 400 illustrates different operating points of a magnetic field B and a magnetizing field H for the magnet. B and H fields are typically related by a magnetic permeability $\mu=B/H$. Vector 405 shows an operating point 410 on the magnetization curve 400 that can show a B/H relationship for the magnet when the magnet is "unloaded". That is, point 410 can describe the B/H relationship for the magnet when there is no nearby ferrous material. Unfortunately, if the operating point is below a knee 415 on magnetization curve 400, then when the magnet is heated, the magnet can partially or completely lose magnetization.

Vector 425 shows a second operating point 430. A magnet can be configured to operate at operating points closer to the B axis of the magnetization (such as point 430) curve 400 by "loading" the magnet by placing ferrous materials near the magnet. In one embodiment, the operating point 430 can be achieved by containing substantial amounts of magnetic field lines from the magnet within the magnet. One advantage to operating the magnet near the B-axis away from knee 415 is that magnet can be made less sensitive to elevated temperatures. That is, the magnet can undergo exposure to elevated temperatures without losing some or all of its related magnetism.

Figure 5A:
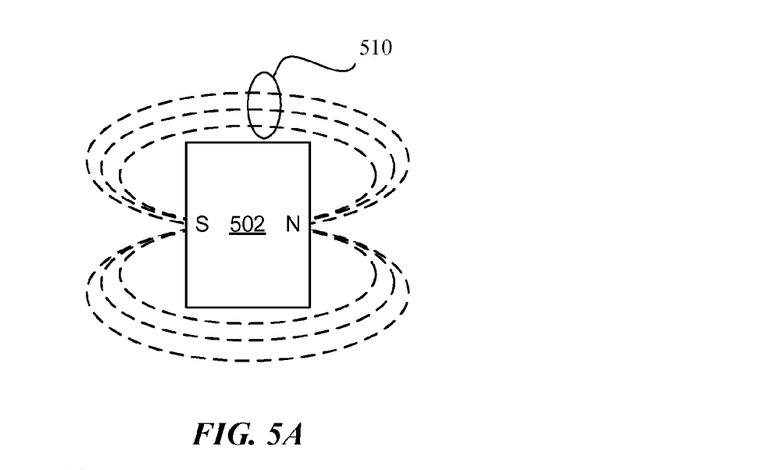
FIGS. 5A-5C show possible effects of ferrous materials placed near a magnet.
Figure 5B:
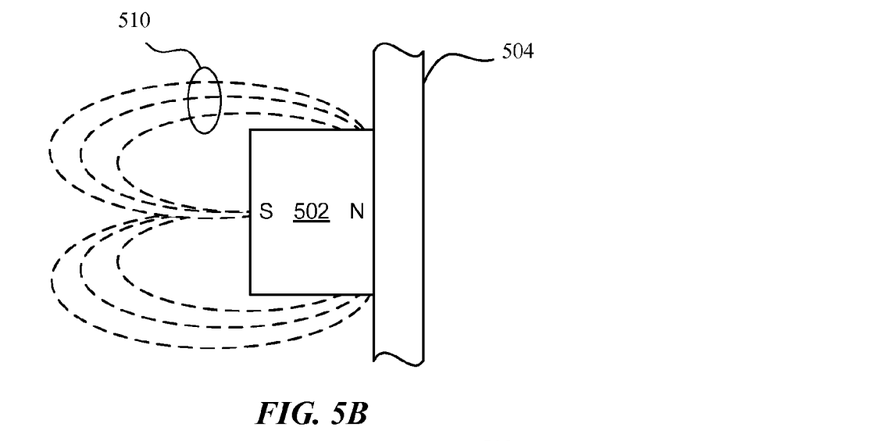
Figure 5C:
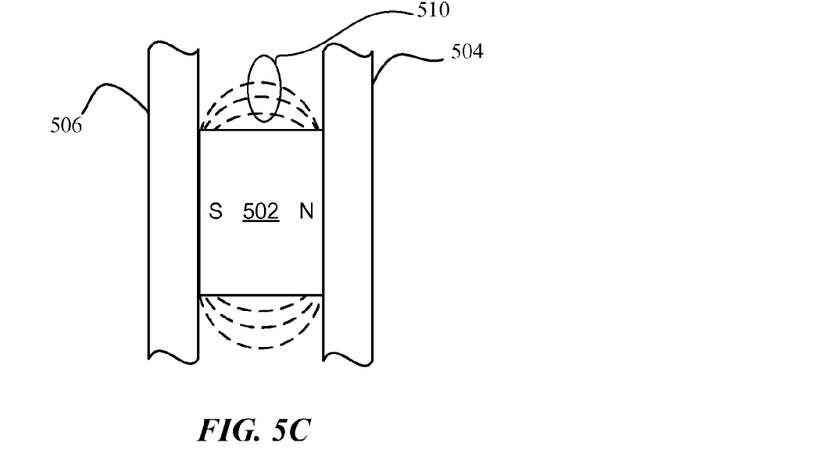

FIGS. 5A-5C show possible effects of ferrous materials placed near a magnet 502. In FIG. 5A, magnet 502 is unloaded. That is, no ferrous material is placed near magnet 502. Magnetic field lines 510 are shown travelling from a first magnetic pole to a second magnetic pole. In FIG. 5B a first ferrous object 504 is placed near a north pole of magnet 502. The ferrous object 504 can have sufficient magnetic permeability to contain substantially all of the magnetic field lines 510. In some embodiments, ferrous objects 504 specifically designed to contain or reflect magnetic field lines are referred to as magnetic shunts. FIG. 5B shows magnetic field lines 510 skewed toward the south pole of magnet 502 away from ferrous object 504. FIG. 5C shows magnet 502 with the first ferrous object 504 and a second object 506 positioned near each pole of magnet 502. In such a configuration substantially all magnetic field lines 510 can be constrained closely to magnet 502. As substantially all magnetic field lines 510 are maintained within magnet 502, the operating point of magnet 502 can be moved closer to the B-axis as described in FIG. 4. For example, a configuration shown in FIG. 5C can move the operating point of magnet 502 from point 410 to point 430 on curve 400. In doing so, the magnet 502 can be made less sensitive to elevated temperatures.

Figure 6:
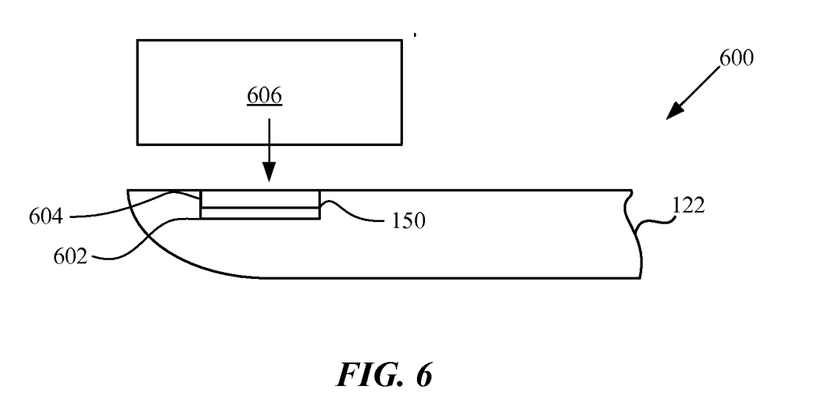
FIG. 6 is a simplified diagram of a portion of the rear cover 122 including a magnetic.

FIG. 6 is a simplified diagram of a portion of the rear cover 122 including a magnetic assembly 150. The rear cover 122 can be configured to support magnetic assembly 150. In one embodiment, magnetic assembly 150 can include magnet 604 and magnetic shunt 602. Magnetic shunt 602 can cause field lines of magnet 604 to move away from the magnetic shunt 602. In one embodiment, magnetic shunt 602 and magnet 604 can be affixed to rear cover 122 with an adhesive. That is, magnetic shunt 602 can be attached to the rear cover 122 with an adhesive. Following that, magnet 604 can be attached to magnetic shunt 602 with the adhesive. In one embodiment, the adhesive can include a curing characteristic that enables the adhesive to cure relatively more quickly when the adhesive is brought to an elevated temperature. For example, the adhesive can cure (set up, or harden) to a predetermined amount when heated to approximately 55 degrees Celsius (within a tolerance amount such as +/−1 degree; other embodiments can have other tolerance amounts) for about five minutes. In another embodiment, the adhesive can cure to the same predetermined amount when heated to approximately 85 degrees Celsius for between one and two minutes. For reference, room temperature can between 25 and 30 degrees Celsius. In one embodiment, the adhesive may not be fully cured after exposure to an elevated temperature for a predetermined time period. Rather, the adhesive can be partially cured, but have an increased tack that can enable further handling of the magnet assembly 150 while the adhesive continues to cure at room temperature.

A magnetic keeper 606 can be applied to magnet 604. The magnetic keeper 606 can function much as a magnetic shunt as described above. The magnetic keeper 606 can be formed from a ferrous material and can be configured to include sufficient surface area and volume to substantially contain all magnetic field lines from magnet 604. The magnetic keeper 606 can be formed from a material with relatively good permeability. In one embodiment magnetic keeper 606 can be larger than magnet 604. In another embodiment, magnetic keeper and (optionally) magnetic shunt 602 can be formed from a high magnetic permeability material such as American Iron and Steel Institute (AISI) 1010 steel or AISI 1005 steel. In such embodiments, magnetic keeper 606 can be relatively smaller than described above. When magnetic keeper 606 is brought adjacent to magnet 604 substantially all magnetic field lines can be contained with magnet 604, particularly when magnetic shunt 602 is positioned at an opposing end of magnet 604. In this configuration, magnet 604 and the adhesive can be heated to an elevated temperature for a predetermined amount of time to cure the adhesive to a first amount. In one embodiment, the adhesive may not be fully cured after exposure to the elevated temperature. But rather, the adhesive can be set enough to allow further manufacturing processing while the adhesive continues to cure at room temperature. In one embodiment, magnet 604 can be formed from a rare-earth material such as neodymium. Magnetic keeper 606 can be removed after heating of the magnet 604. In one embodiment, the temperature of magnet 604 is reduced prior to removing magnetic keeper 606.

Figure 7:
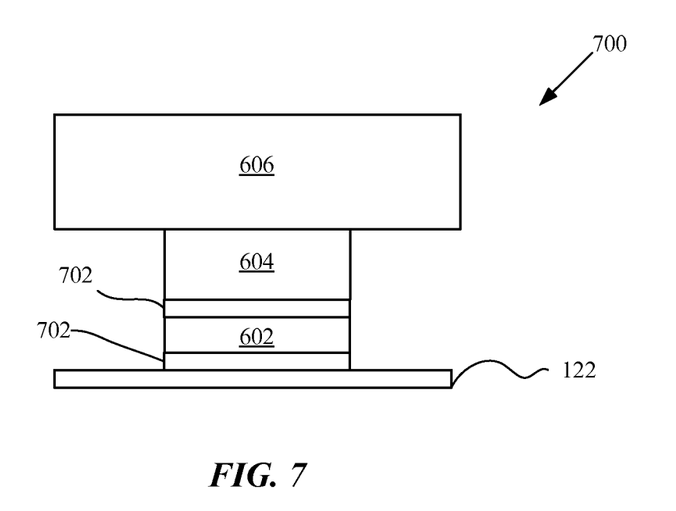
FIG. 7 is a block diagram of a fixture for curing an adhesive in accordance with one embodiment described in the specification.

FIG. 7 is a block diagram of a fixture for curing an adhesive in accordance with one embodiment described in the specification. Rear cover 122 can be configured to support magnet 604 and magnetic shunt 602. As shown, magnetic shunt 602 can be affixed to rear cover 122 with adhesive 702. Magnet 604 can be bonded to magnetic shunt 602 with adhesive 702. In one embodiment, adhesive 702 can cure faster at elevated temperatures especially when compared to room temperature. As shown in FIG. 7, when magnetic keeper 606 is on one side of magnet 604 and magnetic shunt 602 is on another side of magnet 604, then substantially all of the magnetic field lines can be contained within magnet 604. Thus, adhesive 702 can receive an elevated temperature without affecting magnetic characteristics of magnet 604.

Figure 8:
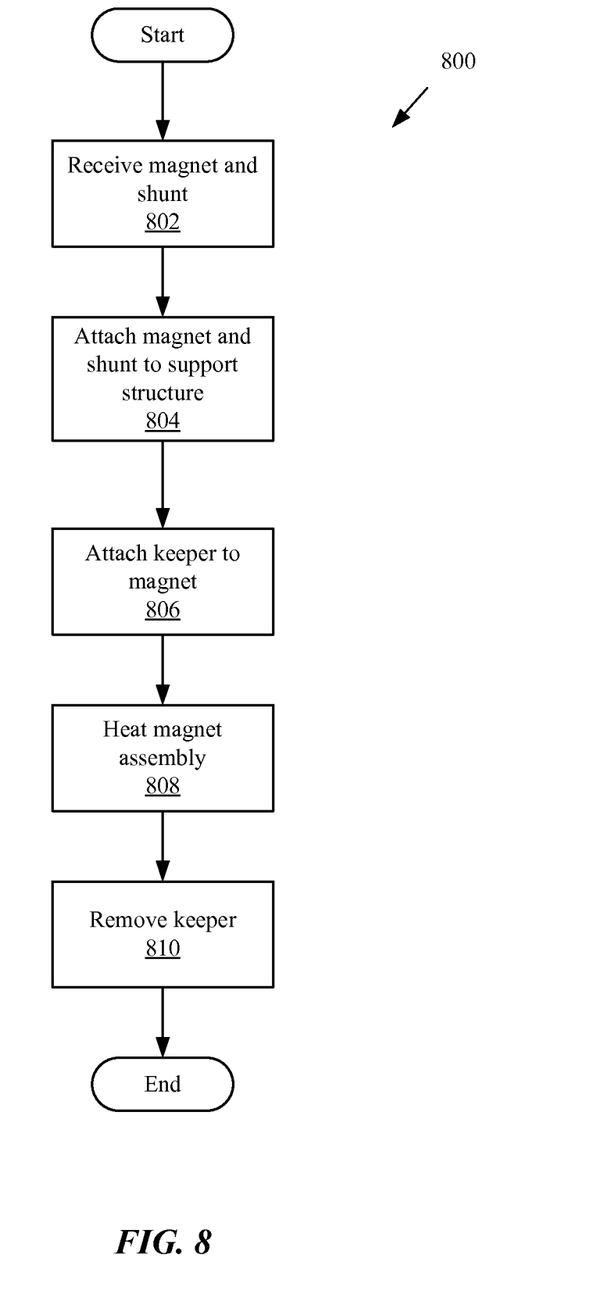
FIG. 8 is a flow chart of method steps for reducing a curing time of an adhesive used for attaching a magnet while preserving magnetic properties of the magnet.

FIG. 8 is a flow chart of method steps 800 for reducing a curing time of an adhesive used for attaching a magnet while preserving magnetic properties of the magnet. The method begins in step 802 where a magnet 604, and a magnetic shunt 602 (shown in FIG. 7) are received. In step 804, the magnet 604 and the magnetic shunt 602 are attached to a support structure. For example, the magnetic shunt 602 can be attached to a rear cover 122 with an adhesive 702 followed by the magnet 604 attached to the magnetic shunt 602 with the adhesive 702. In one embodiment, the adhesive 702 can cure more quickly when heated to an elevated temperature. In step 806, a magnetic keeper 606 can be temporarily attached to magnet 604. In step 808, the magnet assembly (the magnet, the magnetic shunt, the magnetic keeper, the adhesive and the support structure) can be heated to cure the adhesive. In step 810, the magnetic keeper 606 can be removed from the magnet 604 and the method ends.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for attaching a magnet having a magnetic field strength to a lid of a computing device, the method comprising:

attaching a magnetic shunt to the lid with a first adhesive;
attaching the magnet to the magnetic shunt with a second adhesive;
placing a magnetic keeper adjacent to the magnet, wherein magnetic fields from the magnet are substantially contained within the magnetic shunt and the magnetic keeper;
heating the magnet, the magnetic shunt, the first adhesive and the second adhesive to a predetermined temperature for a predetermined amount of time; and
removing the magnetic keeper,
wherein the magnetic keeper maintains the magnetic field strength of the magnet after heating the magnet, the magnetic shunt, the first adhesive and the second adhesive.

2. The method of claim 1, wherein the adhesive is free of being fully cured after the heating.

3. The method of claim 2, wherein the predetermined temperature is approximately 85 degrees Celsius.

4. The method of claim 3, where the predetermined time is approximately 1 and 2 minutes.

5. The method of claim 1, wherein the magnetic shunt is formed from American Iron and Steel Institute (AISI) 1010 steel.

6. The method of claim 1, where the magnet is a neodymium magnet.

7. The method of claim 1, wherein the lid and a base portion are formed from a non-ferrous material, and wherein the base portion includes an attractor plate configured to magnetically couple with the magnet.

8. The method of claim 1, wherein the magnetic keeper is free of contact with the magnet.

9. The method of claim 1, wherein the magnetic keeper is free contact with a structure except for the magnet.

10. A method for reducing a curing time of an adhesive used for bonding a magnet while preserving a magnetic field strength of the magnet, the method comprising:

affixing the magnet to a lid with an adhesive, wherein the lid is pivotally coupled to a base portion comprising an attractor plate positioned such that the attractor plate is magnetically attracted to the magnet when the lid pivots in a direction toward the base portion;
attaching magnetic keepers to a first magnetic pole and a second magnetic pole of the magnet;
heating the magnet, the adhesive, the magnetic keepers and the support structure from a first temperature to a second temperature; and
removing at least one magnetic keeper, wherein the magnet retains the magnetic field strength subsequent to heating the magnet.

11. The method of claim 10, wherein the magnetic keepers have sufficient thickness and surface area to contain substantially all magnetic field lines from the magnet.

12. The method of claim 10, wherein the magnetic keepers are formed from a ferrous material.

13. The method of claim 12, wherein the magnetic keeper is formed from American Iron and Steel Institute (AISI) 1010 steel.

14. The method of claim 12, wherein the magnet is a neodymium magnet.

15. The method of claim 10, wherein one of the magnetic keepers is a magnetic shunt.

16. The method of claim 10, wherein the second temperature is about 85 degrees Celsius.

17. The method of claim 10, wherein the magnet is approximately the same size as the magnetic shunt.

18. The method of claim 10, wherein the adhesive includes a curing time dependent upon heating the adhesive.

19. The method of claim 10, wherein the magnetic keepers include a thickness greater than a thickness of the magnet.

* * * * *